(12) United States Patent
Proux et al.

(10) Patent No.: US 8,566,694 B2
(45) Date of Patent: Oct. 22, 2013

(54) MULTI-DIMENSIONAL DOCUMENTS FOR PARALLEL CONTENT DISPLAY ON A SINGLE SCREEN FOR MULTIPLE VIEWERS

(75) Inventors: Denys Proux, Eybens (FR); Claude Roux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 150 days.

(21) Appl. No.: 13/079,447

(22) Filed: Apr. 4, 2011

(65) Prior Publication Data

US 2012/0254732 A1 Oct. 4, 2012

(51) Int. Cl.
*G06F 17/00* (2006.01)

(52) U.S. Cl.
USPC ........... 715/203; 715/201; 715/204; 715/234; 715/243; 348/51; 348/56

(58) Field of Classification Search
USPC ......... 715/201, 202, 229, 203, 204, 234, 243; 348/51, 56
See application file for complete search history.

(56) References Cited

U.S. PATENT DOCUMENTS

| | | | |
|---|---|---|---|
| 6,188,442 B1* | 2/2001 | Narayanaswami | 348/564 |
| 6,529,175 B2 | 3/2003 | Tserkovnyuk et al. | |
| 6,924,833 B1* | 8/2005 | McDowall et al. | 348/42 |
| 6,956,576 B1* | 10/2005 | Deering et al. | 345/475 |
| 7,221,405 B2* | 5/2007 | Basson et al. | 348/468 |
| 8,189,038 B2* | 5/2012 | DeCusatis et al. | 348/58 |
| 8,217,996 B2* | 7/2012 | Kane et al. | 348/55 |
| 8,284,834 B2* | 10/2012 | Inoue et al. | 375/240.01 |
| 8,305,488 B2* | 11/2012 | Trowbridge et al. | 348/387.1 |
| 2007/0216868 A1* | 9/2007 | Cashin et al. | 352/90 |
| 2007/0247477 A1* | 10/2007 | Lowry et al. | 345/629 |
| 2010/0177174 A1* | 7/2010 | Ko et al. | 348/56 |
| 2011/0069153 A1* | 3/2011 | Nakane | 348/43 |
| 2011/0285817 A1* | 11/2011 | Tsukagoshi | 348/43 |
| 2012/0092469 A1* | 4/2012 | Kovalick | 348/56 |
| 2012/0190439 A1* | 7/2012 | Nourbakhsh | 463/31 |
| 2012/0262454 A1* | 10/2012 | Tsukagoshi | 345/419 |
| 2012/0320100 A1* | 12/2012 | Machida et al. | 345/690 |
| 2013/0038685 A1* | 2/2013 | Matthews | 348/43 |

OTHER PUBLICATIONS

Dr. Luanne Fose, Microsoft PowerPoint 2003, Published 2004, pp. 1 through 30. http://www.training.calpoly.edu/guides/powerpoint/PowerPoint2003.pdf.*
Jonathon Fincher, 'Son's Entertainment Access Glasses Provide Private Closed Captions for Deaf People', Gizmag.com, Jul. 19, 2012.*

* cited by examiner

*Primary Examiner* — Stephen Hong
*Assistant Examiner* — Matthew Ludwig
(74) *Attorney, Agent, or Firm* — Fay Sharpe LLP

(57) ABSTRACT

A system, method, and storage medium for generating visual content in plural versions for substantially simultaneous display on the same display device are provided. The system includes memory for storing static content having at least one document element common to a first and second version of a document, multi-dimensional content having at least one customized document element for each document version to be inserted into a variable area within the first and second versions of the document, and multi-dimensional parameters defining static areas, variable areas, and customized document elements for each document version. The system further includes a rendering module adapted to generate a first frame-image corresponding to the first document version and a second frame-image corresponding to the second document version by arranging the static content and multi-dimensional content of each document version according to the multi-dimensional parameters.

21 Claims, 8 Drawing Sheets

MULTI-DIMENSIONAL DOCUMENTS FOR PARALLEL CONTENT DISPLAY ON A SINGLE SCREEN FOR MULTIPLE VIEWERS

BACKGROUND

The exemplary embodiment relates to processing of visual content. It finds particular application in connection with a system and method for displaying multiple customized views of two dimensional (2D) content in parallel to multiple viewers of a single screen.

Three-Dimensional (3D) displays are becoming more common. A 3D display allows a user to view visual content (such as single images (slides) or video) and perceive it in three dimensions. One technique utilized by 3D displays is to create the illusion of depth in a user's brain from a pair of 2D images displayed at the same time (or substantially at the same time). One way to enhance depth perception in the brain is to provide the viewer's eyes with two different images, each image representing one perspective of the same object. The two images have minor deviations corresponding to the perspectives that both eyes naturally receive in binocular vision. Specially configured eye glasses coupled with a 3D display enable one eye to view the first image while the second eye views the second image. The viewer's brain interprets and combines the two images and generates a 3D view for the viewer.

A problem in the field of multimedia presentations is that with only a single two dimensional (2D) or 3D display device available, multiple viewers view the same visual content. It would be desirable for different viewers in an audience to be able to perceive different visual content, which is customized for each viewer.

BRIEF DESCRIPTION

In accordance with one aspect of the exemplary embodiment, a method for displaying visual content is provided. The method includes displaying a plurality of versions of visual content repeatedly and in a sequence on a same display device. The plurality of versions includes static content, which is the same for each of the plurality of versions, and variable content, which is different for each of the plurality of versions. The method further includes synchronizing the displaying of a first of the plurality of versions of the visual content with a first viewing device for a first viewer of the display device and synchronizing the displaying of a second of the plurality of versions of the visual content with a second viewing device for a second viewer of the display device, enabling the first and second viewers to view the static content together with respective different variable content substantially simultaneously with each other.

In another aspect, a system for generating visual content for simultaneous display on a same display device is provided. The system includes memory which stores static content having at least one document element common to a plurality of versions of a document, multi-dimensional content having at least one customized document element for each document version to be inserted into a variable area within the respective version of the document, and multi-dimensional parameters defining static areas, variable areas, and customized document elements for each document version. The system also includes a rendering module adapted to generate a first frame-image corresponding to a first of the document versions and a second frame-image corresponding to a second of the document versions by arranging the static content and multi-dimensional content of each document version according to the multi-dimensional parameters.

In yet another aspect, a storage medium containing, in computer readable form, a multi-dimensional document is provided. The storage medium includes non-transitory memory which stores a plurality of frame-images, each frame-image corresponding to a different version of a document. The document includes at least one static area having a document element common to each version of the document, and at least one variable area having a document element customized for each version of the document.

In another aspect, a storage medium containing, in computer readable form, a multi-dimensional document is provided. The multi-dimensional document includes at least one document frame, each document frame including a set of multidimensional document elements and a plurality of frame-images. Each frame-image corresponds to a different version of the document frame. Each frame-image includes at least one static area comprising a document element which is common to a plurality of the frame-images, and at least one variable area for receiving a respective one of the set of multidimensional document elements. The storage medium also includes instructions for matching each document element in the set of multi-dimensional content to a respective one of the variable areas to generate the at least one page frame.

In yet another aspect, a method for displaying visual content is provided. The method includes providing a first frame-image comprising variable content and static content and providing a second frame image comprising the same static content and different variable content. Repeatedly and in sequence, the first and second frame images are displayed on a same display device at a frequency such that they are substantially simultaneously displayed, whereby when first and second viewers wear respective synchronized viewing devices, the first viewer views the first frame image and not the second frame image and the second viewer views the second frame image and not the first frame image.

DETAILED DESCRIPTION

Figure 1:
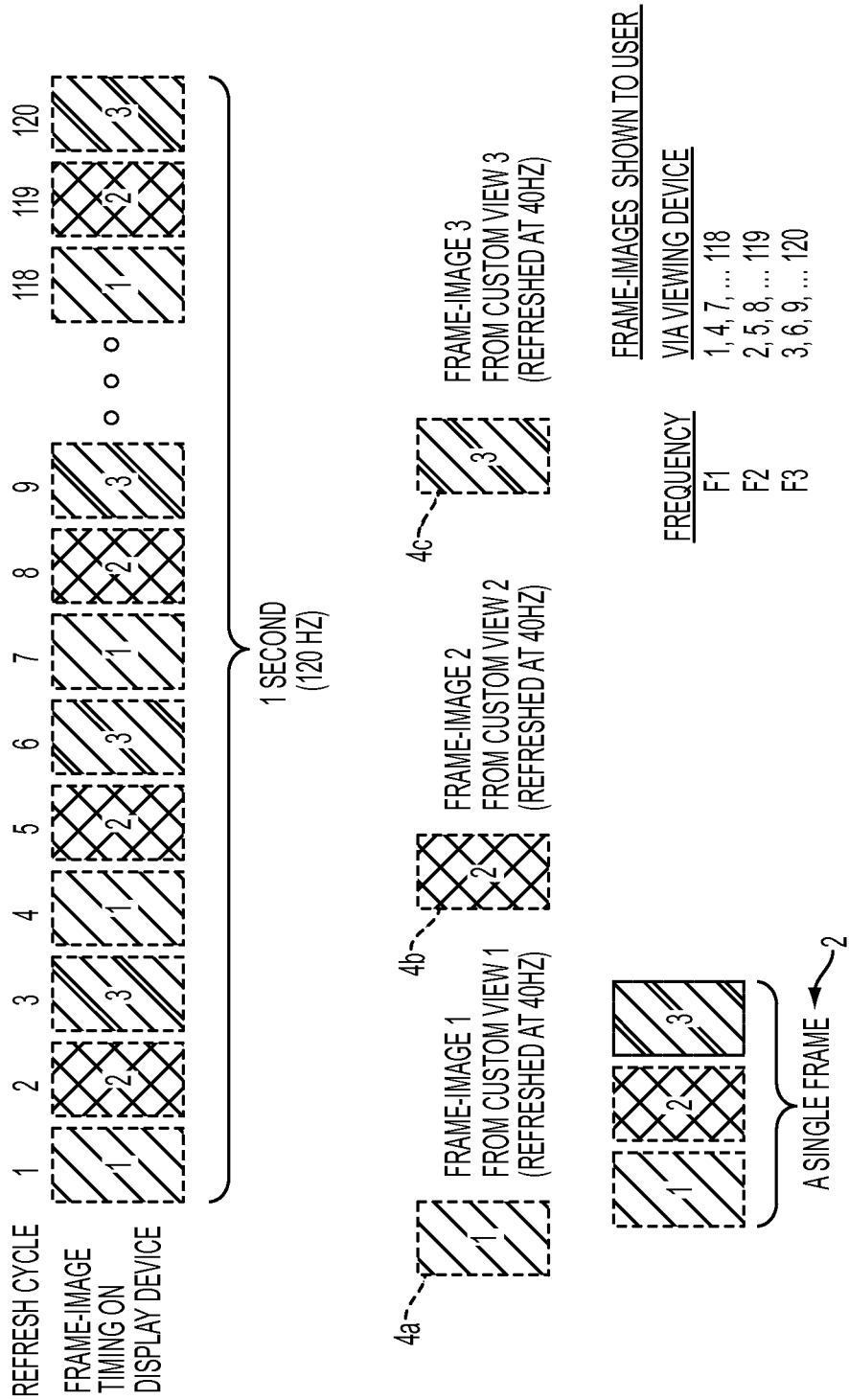
FIG. 1 illustrates the composition of a frame containing frame-images, and the timing for displaying the frame-images on a display device.

Aspects of the exemplary embodiment relate to displaying, in parallel, multiple customized views (versions) of two dimensional (2D) content on a single screen. Additionally, the exemplary method and system allow for the displaying of a document (such as a slide show, video or other document with visual content) with areas for static and variable visual content (and enabling members of a same audience to view the customized versions of the document on a single screen. In the exemplary embodiment, this is accomplished by displaying frame images of customized content at predefined intervals on a single display device. A user views the display device through a viewing device synchronized with the refresh rate of the display device. The viewing device allows the viewer to see only the content corresponding to a particular customized view. For example, a same screen may display differing textual translations (variable content) of a document, along with static content common to all versions of the document, substantially simultaneously. Specialized viewing devices (such as eye glasses) are used to allow only a single language (e.g., the variable content), along with the static content, to be viewable for any given member of the audience. Thus, on the same screen, the different language versions of the presentation are displayed at the same time, and properly configured viewing devices allow audience members to filter out the languages they do not understand. The exemplary embodiment employs techniques similar to those used in the display of three dimensional (3D) content on a 2D display (such as a television or computer monitor), but in this case, viewers view different variable content substantially simultaneously.

A "display device," as used herein can be an output device for presentation of visual information that is acquired, stored, or transmitted in various forms. Examples of display devices include, but are not limited to, liquid crystal displays (LCDs), cathode ray tube (CRT) displays, plasma displays, and digital light processing (DLP) displays. The display device may be a self contained unit (such as a traditional CRT computer monitor), or it may be in the form of a projector which forms an image on a screen at a distance.

A "viewing device" generally refers to a type of eyewear worn by a user which includes one or more lenses that filter images rendered by a display device. Examples of viewing devices include, but are not limited to, active shutter glasses, LC shutter glasses, anaglyph glasses, and polarized glasses.

The system may operate using anaglyph, polarization, or alternate frame sequencing, which are techniques that have been used in 3D systems, but which are used differently in the exemplary embodiments. In an anaglyph system, the viewing device includes colored lenses which filter out visual content based on color. In a polarization system, two projectors display respective images with different polarization. Each viewing device for viewing the polarized images may have lenses corresponding to one of the respective polarizations.

Alternate frame sequencing (AFS) technology is best suited to the exemplary system and method. This type of system allows images to be displayed for a predetermined amount of time at a certain frequency. The synchronization between active shutter glasses and the display is performed via a synchronization signal between the glasses and the display. The synchronization signal instructs the active shutter glasses as to when to darken the lenses of a respective viewing device.

In the exemplary method and system provided herein, instead of providing a different image to each eye, as in a 3D system, the same image can be provided to both eyes of a viewer concurrently at specified intervals, by a respective viewing device, where two viewing devices allow for different variable visual content to be provided to respective viewers. The display device receives an input signal with n prerendered frame-images (e.g., representing n customized views or versions) that are repeated at a high frequency, which can be expressed in terms of repeats per second in Hz (120 Hz, for example). The display device is synchronized with one or more viewing devices that allow a user to view only one of the n frame-images during the specified interval. This creates the illusion for the user that they are viewing a display with only a single image or customized view (or set of images in the case of motion pictures). In general, the frequency with which each frame-image is repeated is at least 20 Hz.

Put another way, the exemplary embodiment allows for the display of differing content concurrently on a single display. Advantages of the exemplary embodiment include allowing multiple users to concurrently view content customized to each particular user, and allowing a user to switch easily from one customized view to another.

While the exemplary embodiment is described in terms of an AFS system, it is to be appreciated that polarization and anaglyph systems are also contemplated.

Alternate frame sequencing has some advantages over the other techniques in that it provides more flexibility due to the ability to provide for a variable number of custom views on a single display. For example, assuming that there are n custom views to be viewed on a single display, AFS allows users to synchronize their viewing device (such as active shutter lenses) to one of n frequencies. At time T1, the customized view related to visual content C1 is displayed on the display device, and people with viewing devices set to frequency F1 will see visual content C1 and viewing devices with a frequency of F1 offset by a delay t will have their lenses darkened until their respective content is displayed on the display device. At time T1+t, the customized view related to visual content C2 is displayed and people having viewing devices with a frequency of F1 offset by a delay t will see the visual content C2 and people having a different delay from t will then have their lenses darkened, and so forth.

In other words, instead of alternately darkening each lens, as is the case with traditional 3D displays and viewing devices, the two lenses of the viewing device can be darkened at the same time according to a specified frequency interval tuned (synchronized) to the refresh rate of the display device.

The input to the exemplary display device is a sequence of frames, with each frame comprising a plurality of frame-images. In the exemplary embodiment, there is one frame-image per customized view. Each frame-image of the frame is rendered on the display device for at least one refresh cycle. In the exemplary embodiment, each frame-image is rendered on the display for a single refresh cycle, and in the case of static images, the set of frame-images are repeated continuously for an amount of time. For example, FIG. 1 illustrates the display timing of a single frame 2 comprising frame-images 4a-4c on a display device having a refresh rate (i.e., frequency) of, for example at least 60 Hz, such as 120 Hz. Each frame-image 4a-4c can be displayed in successive order for exactly one refresh cycle on the display device. The effective refresh rate for any individual frame-image 4a-4c is 40 Hz, in this example (i.e., the display refresh rate divided by the number of frame-images per frame), since each of the three frame-images is refreshed 40 times during the 120 cycle period. In this way, frame-images 4a-4c are displayed substantially simultaneously with each other. By substantially simultaneously, it is meant that each frame image is displayed within less than 0.05 seconds of each next subsequent and preceding frame-image in the sequence, such as less than 0.01 seconds apart. The display timing may be adjusted based on the refresh rate of the display device and the number of frame-images per frame. For instance, a display device having a frequency of 200 Hz may display each of three customized views at a frequency of about 66 Hz. For four customized views, each corresponding to a respective frame-image, the resulting frequency would be 50 Hz. If the refresh rate of the display device is too low with respect to the number of customized views, then image glare and flickering may appear to the end user. Introducing too many customized views or parallel images may generate the phenomenon of flickering due to the time delay involved in displaying all of the other customized views (during which both lenses are darkened until it is time to display the frame-image corresponding to the user's customized view).

While three frame-images 4a, 4b, 4c are shown, it is to be appreciated that there may be any number of frame-images, such as from 2-10 frame-images per frame 2, each having different visual content. For example, the exemplary method and system have been shown to be effective for 2-4 customized views with a conventional display device. For more customized views, a corresponding increase in the refresh rate of the display device may be employed. Additionally, some embodiments may brighten the customized view rendered on the display device in order to compensate for the lower exposure time of the custom view.

Figure 2:
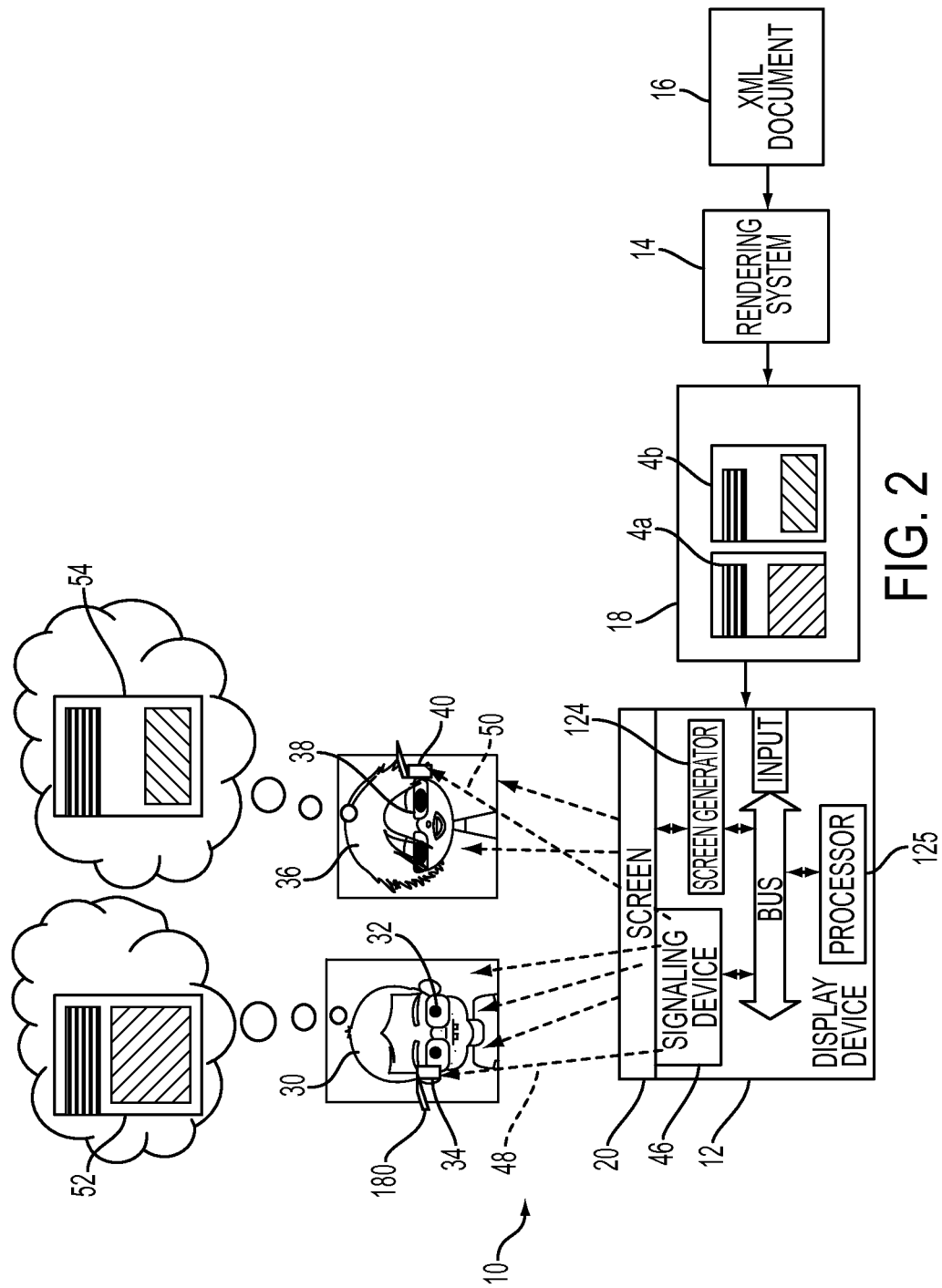
FIG. 2 illustrates an exemplary system for generating and displaying multidimensional visual content.

FIG. 2 provides an overview of an exemplary viewing system 10. The viewing system 10 includes a display device 12 and a rendering system 14, which may be separate or combined. A multidimensional document 16 is received by the rendering system 14, which generates visual content 18 to be input to the display device. The visual content includes a sequence of frame-images 4a-4c for each document frame. The frame-images 4a-4c are then displayed on a screen 20 of the display device 12. A first viewer (i.e., a first person) 30 wears a first viewing device (e.g., filtering glasses) 32 associated with a first receiver 34 and a second viewer (a second person) 36 wears a second viewing device (filtering glasses) 38 with a second receiver 40. The second receiver 40 is tuned to the same frequency but different time delay t from the first receiver 34. A signaling device 46 communicates with the receivers 34, 34, e.g., via radio frequency or other electromagnetic signals 48, 50, causing the receivers to operate the viewing devices 32, 38, at the corresponding frequency plus any respective time delay t in synchronization with the displayed frame-images. Thus, for example, the first viewer 30 views only frame 4a, for example, generating, in the viewer's mind, a first viewed image (customized view) 52, and the second viewer 36 views only frame 4b, for example, creating, in the viewer's mind a second viewed image (customized view) 54, different from the first viewed image 52. The two images 52, 54, are generated substantially simultaneously. While only two viewers 30, 36 are illustrated for convenience, it is to be appreciated that multiple viewers can view a respective one of the two customized views with respective filtering glasses. As will be appreciated, the document 16 may be an audio-visual document containing audio as well as visual content, in which case, both viewers 30, 36 may receive the same audio content, e.g., via speakers (not shown) on or associated with the display device, or may receive custom audio content, e.g., via headphones.

Figure 3:
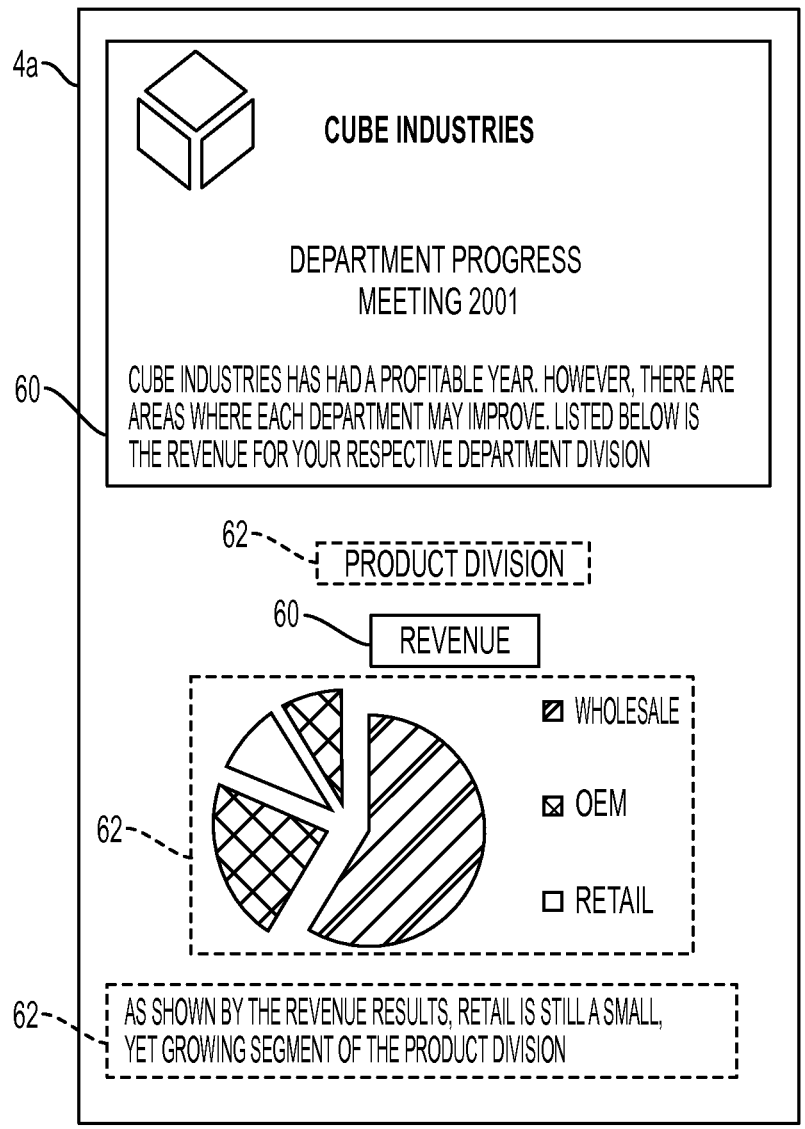
FIGS. 3 and 4 illustrate example frame-images for customized views of a document including static and variable areas.
Figure 4:
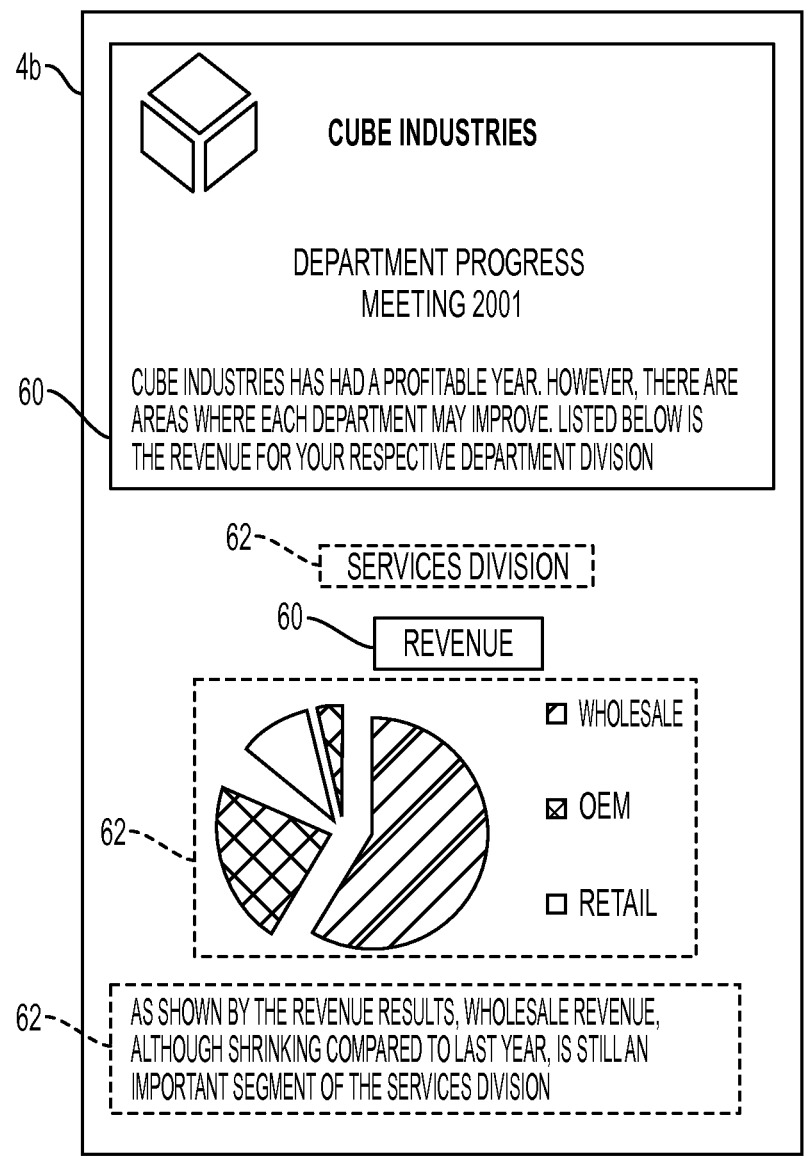

With respect to customized views, the exemplary embodiment allows for the creation and simultaneous display of a document 16 containing localized variations corresponding to differing users 30, 36. Each set of localized variations of a document is considered a customized view of the document. FIGS. 3 and 4 illustrate example document pages (or images derived from a document) 4a, 4b that have been customized for two different groups of viewers. Both document pages 4a, 4b are directed to a department progress meeting and discuss financial information for a company called Cube Industries. Document page 4a is directed specifically to the product division within Cube Industries and document page 4b is directed specifically to the services division of the same company. With the exemplary method and system, both document images 4a, 4b are displayed on a single display device 12 substantially simultaneously (e.g., within less than 0.1 seconds of each other, such as less than 0.01 seconds apart). Assuming that document 4a is rendered on the display screen 20 at frequency F1 and document 4b at frequency F1+t, where t represents the phase difference, employees 30 from the product division wear viewing devices 32 corresponding to the frequency F1 and employees 36 from the services division wear viewing devices 38 corresponding to frequency F1 with delay t. This allows every employee to concurrently view the financial report specific to their division within the company, without having to resort to using two separate displays.

The two document frame-images 4a, 4b have common (static) and customized (variable) areas. For illustrative purposes, the areas 60 common to each document image 4a, 4b are surrounded by a solid line while areas 62 that are customized with variable content for each document image are surrounded by a dashed line. The common areas 60 are referred to as the static content of the document. The customized (variable) content 62 for a particular document frame can be instantiated as a dimension of the document. The customized content 62 is contained within a variable content area 64 of the document 16. A document 16 containing variable content in one or more of its frames 2 is referred to herein as a multidimensional document. Thus, a multi-dimensional document 16 is a document having at least one variable content area 64 that may be replaced by one of multiple versions of custom content 62. The custom document images 4a, 4b (which become the frame-images rendered by the display device) are created by the rendering system 14.

In one exemplary embodiment, each user's visual content (version) is created with a respective single frame-image per frame 2. In other embodiments, a version may be a combined image which is composed of two or more frame-images. For example, frame-image 4a may include the static content while frame-images 4b and 4c contain the variable content. Thus, for user 30, the viewed visual content may be a combination of only frame-images 4a and 4b, but not 4c, and similarly viewer 36 may view only frame-images 4a and 4c, but not 4b. Since the three frame-images are displayed in a defined sequence with a high frequency, the user does not discern that he is viewing two different images in sequence.

Viewing devices 32, 38 can be similarly configured and may include a pair of lenses, one for each eye of the viewer, which are mounted together in a common frame suitable for wearing on the user's head, i.e., with side portions for engaging the user's ears. The term "lens," as used herein does not imply any optical power, although in some embodiments, the lenses may be corrective, i.e., shaped to correct a vision problem of the viewer. Since both lenses are operated concurrently, in other embodiments, a single lens may replace the two lenses, the lens being worn over both eyes. The lens (or lenses) of the viewing device may be formed from glass, plastic, or other transparent material and may include a darkening component which causes the lens to darken/undarken between transparent and opaque in response to signals from the receiver 34, 40. As an example, viewing devices 32,38 may be liquid crystal shutter glasses where the lenses include a liquid crystal layer which becomes dark when a voltage is applied and is otherwise transparent. The glasses can be controlled by an infrared, radio frequency, DLP-Link or Bluetooth transmitter 34 that sends a timing signal that causes both lenses of the glasses 32 to darken over both eyes, and then become transparent, in synchronization with 2× refresh rate of the screen, while the glasses 38 do the same, but with a timing delay equal to the refresh rate (in the case of two frame-images). The two viewers 30, 36 are thus able to view the static visual content 60 of a frame 2 substantially simultaneously with each other and view respective different variable content 106a, 106b of the frame substantially simultaneously with each other.

Figure 5:
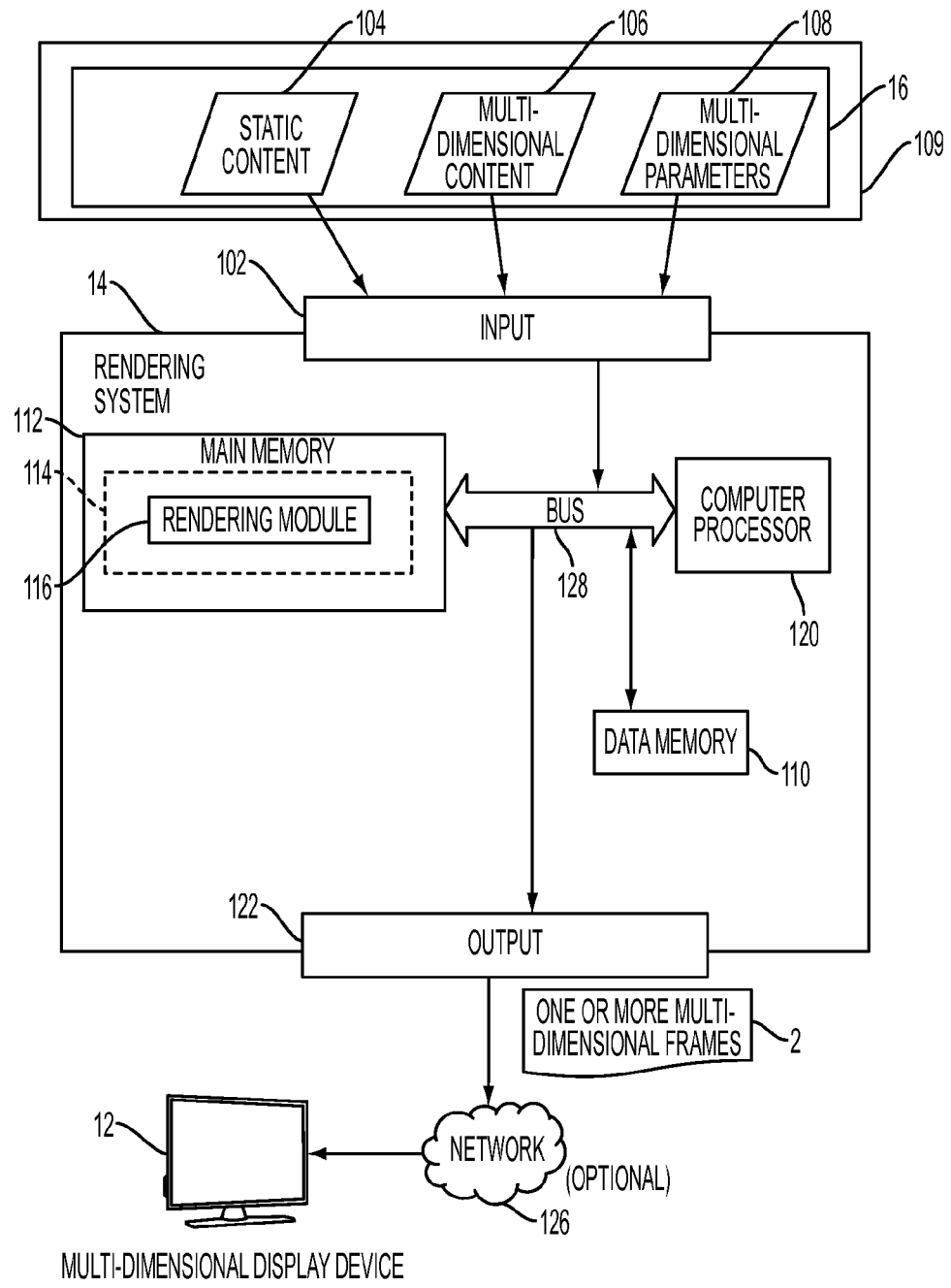
FIG. 5 illustrates a system for processing a multi-dimensional document.

With reference to FIG. 5, an exemplary rendering system 14 for processing multi-dimensional documents is illustrated. The system 14 is a non-transitory device which includes an input device 102 for receiving data representing static visual content 104 for a document 16, multi-dimensional visual content 106 for the document, and multi-dimensional parameters 108 for the document. In the alternative, inputs 104, 106, 108 may be produced by and/or stored in the system 14 itself. The static visual content 104 input contains content that is common to multiple views 4a, 4b, 4c of a document. Static content 104 thus includes, for each multidimensional frame, the content 60 is illustrated in FIGS. 3 and 4. The static content 104 may be embodied as a single document (such as, for example, a Microsoft Word®, PowerPoint®, or Open Office® document) or may be input in parts into the system 14. In the exemplary embodiment, the static content 104 is input as a self-contained document. The multi-dimensional content 106 contains the custom content 62 that is to be incorporated into the static content 104. In the exemplary embodiment, multi-media content 106 is input as individual document elements (such as images or blocks of text) that may be placed within the static document content 104. The multi-dimensional parameters 108 provide instructions to the system 14 as to how the static content 104 and multi-dimensional content 106 should be combined or arranged. In the exemplary embodiment, the multi-dimensional parameters 108 are embodied within an XML (or other markup language) document, although other embodiments may use any other suitable mechanism. Prior to inputting, inputs 104, 106, 108 may be stored in any suitable tangible storage medium 109, such as a disk, ROM or RAM, or may be input into the system 14 in the form of a carrier wave, e.g., via the Internet. The input device 102 may include a modem link, a wired or wireless connection, USB port, floppy or hard disk receiver, transceiver portion of a cellular telephone, or the like and may be separated or combined with other components of the system 14.

The system 14 includes data memory 110 for storing the static content 104, multi-dimensional content 106, and multi-dimensional parameters 108 during processing. Main memory 112 of the system 14 stores instructions 114 for performing the exemplary method, including a rendering module 116. It is to be appreciated that the two memories 110, 112 may be embodied as a single memory unit, or that one or both of the memories 110, 112 may comprise two or more component memory units. The instructions 114 are suitably executed by a digital processor such as computer processor 120. The digital processor 120 can be variously embodied, such as by a single core processor, a dual core processor (or more generally by a multiple core processor), a digital processor and cooperating math coprocessor, a digital controller, or the like. Outputs from module 116 may be stored in memories 110, 112 and/or output via an output device 122 to a display device 12, optionally through a network 126 such as the Internet. In one illustrative example, the system 14 is located on a server that is part of a distributed or cloud computing network. In such a case, inputs 104, 106, 108 may be input to the system 14 remotely via input 102 and input 102 and output 122 modules may be suitably networked to a portal of the server. Processor 120 and memories 110, 112 may be suitably embodied by a digital processor (e.g., microprocessor or parallel array of microprocessors) and memory component(s) of the server.

The rendering module 116 receives as input the static content 104, multi-dimensional content 106, and multi-dimensional parameters 108 via the input device 102. The rendering module 116 generates as output one or more multi-dimensional frames 2 (FIG. 1) comprising a plurality of frame-images 4a, 4b, 4c (FIG. 1). Each frame-image corresponds to one of the customized views (dimensions) of the input static document content 104. The frame-images 4a, 4b, 4c are generated by the rendering module 116 by arranging or combining the multi-dimensional content 106 with the static content 104 for each custom view (e.g., dimension) according to the instructions provided by the multi-dimensional parameters 108. Each resulting frame-image 4a, 4b, 4c represents a customized view of the static content 104. The rendering module 116 then combines the frame-images into one or more multi-dimensional frames 2 to be transmitted to and displayed by the dimensional display device 12. The multi-dimensional frames 2 may be multiplexed into a conventional television or display signal (such as an HDTV broadcast signal) to be rendered on a conventional display device 12 by inserting each frame-image 4a, 4b, 4c into the signal individually. Alternatively, if the display device 12 is suitably configured, the output device 122 may transmit each multi-dimensional frame 2 to the display device 12 as a discrete data unit. In this case, the display device 12 repeats each frame-image 4a, 4b, 4c in sequence until a new multi-dimensional frame 2 is received from the system 14. The exemplary display device 12 may include a screen generator 124 for this purpose, which receives the signal 18 from the rendering system 14 and generates the visual content for display on the screen 20 (FIG. 2). In particular, the screen generator causes a predefined sequence of the frame-images 4a, 4b, 4c to be displayed repeatedly and substantially simultaneously on the screen and coordinates with the signaling device so that the shutter glasses are synchronized at the same frequency and time delay (phase difference). Screen generator 124 may be embodied in software stored in memory of the display device. The software may be implemented by an associated processor 125, which is communicatively connected to the display device memory, and which may be configured analogously to processor 120.

In the exemplary embodiment, components 114, 116 comprise software instructions stored in main memory 112, which are executed by the computer processor 120. The processor 120, such as the computer's CPU, may also control the overall operation of the computer system 14 by execution of processing instructions stored in memory 112. Components 102, 110, 112, 114, 116, 120, 122 may be connected by a data control bus 128.

As will be appreciated, system 14 may include fewer or more components while still having the same functionality. For example, components 110, 112, 114, 116, 120 may be combined to form fewer components, or may be functionally separated to form more individual components.

The rendering system 14 may comprise one or more computing devices, such as a personal computer, PDA, laptop computer, server computer, or combination thereof. In some embodiments, the system 14 may be incorporated into the display device 12. Memories 110, 112 may be integral or separate and may represent any type of computer readable medium such as random access memory (RAM), read only memory (ROM), magnetic disk or tape, optical disk, flash memory, or holographic memory. In one embodiment, the memories 110, 112 comprise a combination of random access memory and read only memory. In some embodiments, the processor 120 and memory 110 and/or 112 may be combined in a single chip.

The system 14 may output the one or more multi-dimensional frames 2 to an external output device, such as display device 12, a server, or the like. The output device 122 may be connected directly with the system 14 or linked thereto, e.g., via a wired or wireless link 126, such as a local area network, wide area network, or the Internet.

The term "software" as used herein is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 6:
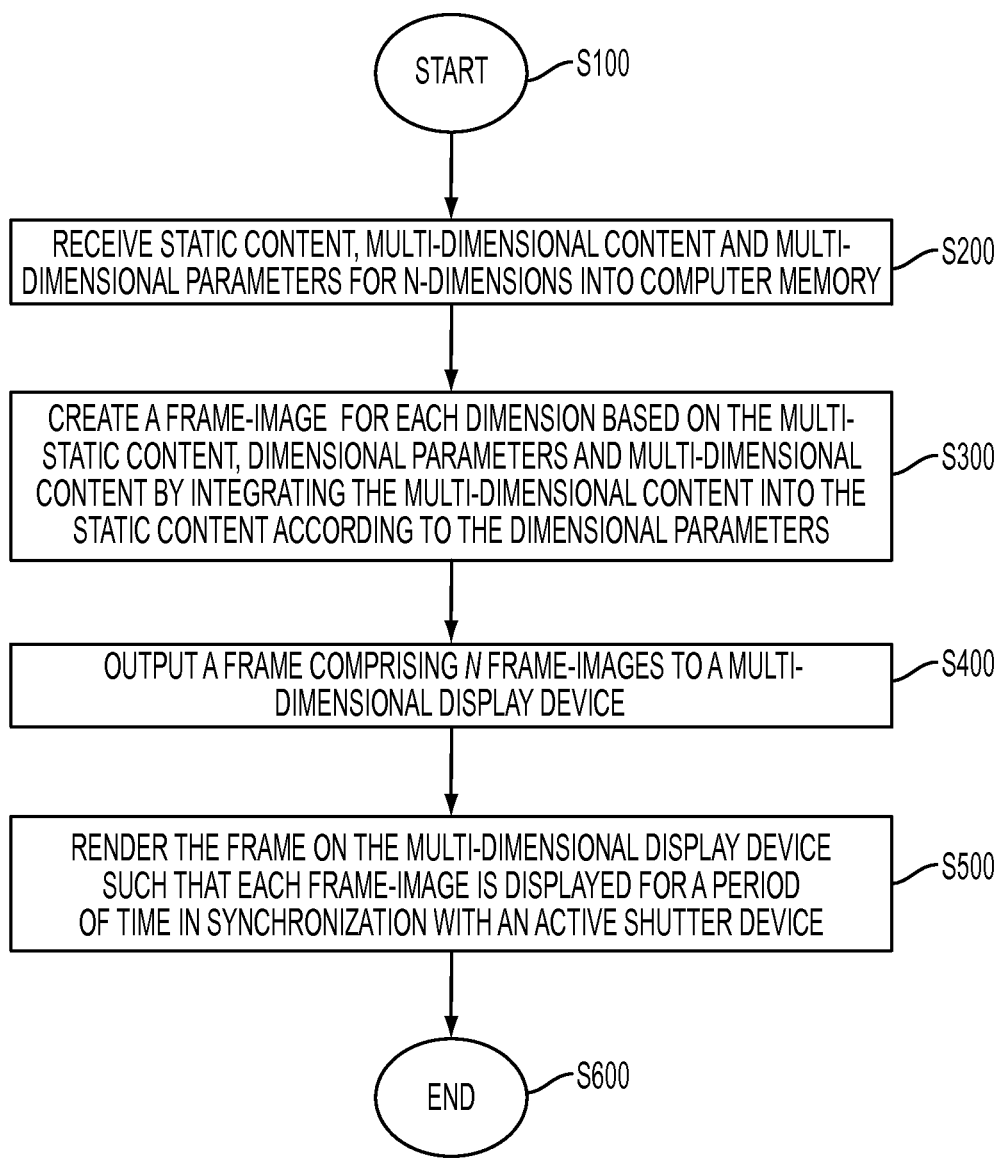
FIG. 6 is a flow chart illustrating a method for processing a multi-dimensional document that may be performed on the system illustrated by FIG. 5.

FIG. 6 illustrates an exemplary method for rendering multiple customized views of two dimensional (2D) visual content to display in parallel to multiple viewers of a single screen 20. The method may be performed with the exemplary system 10, 14 described with reference to FIGS. 2 and 5. The method begins at S100.

At S200, the rendering module 116 receives the static content 104, multi-dimensional content 106 and multi-dimensional parameters 108 into computer memory 110, 112. The multi-dimensional content 106 and parameters 108 contain data for n dimensions which are processed by the rendering module 116 to generate n customized views (each represented as a frame-image 4) of the static content 104.

Figure 7:
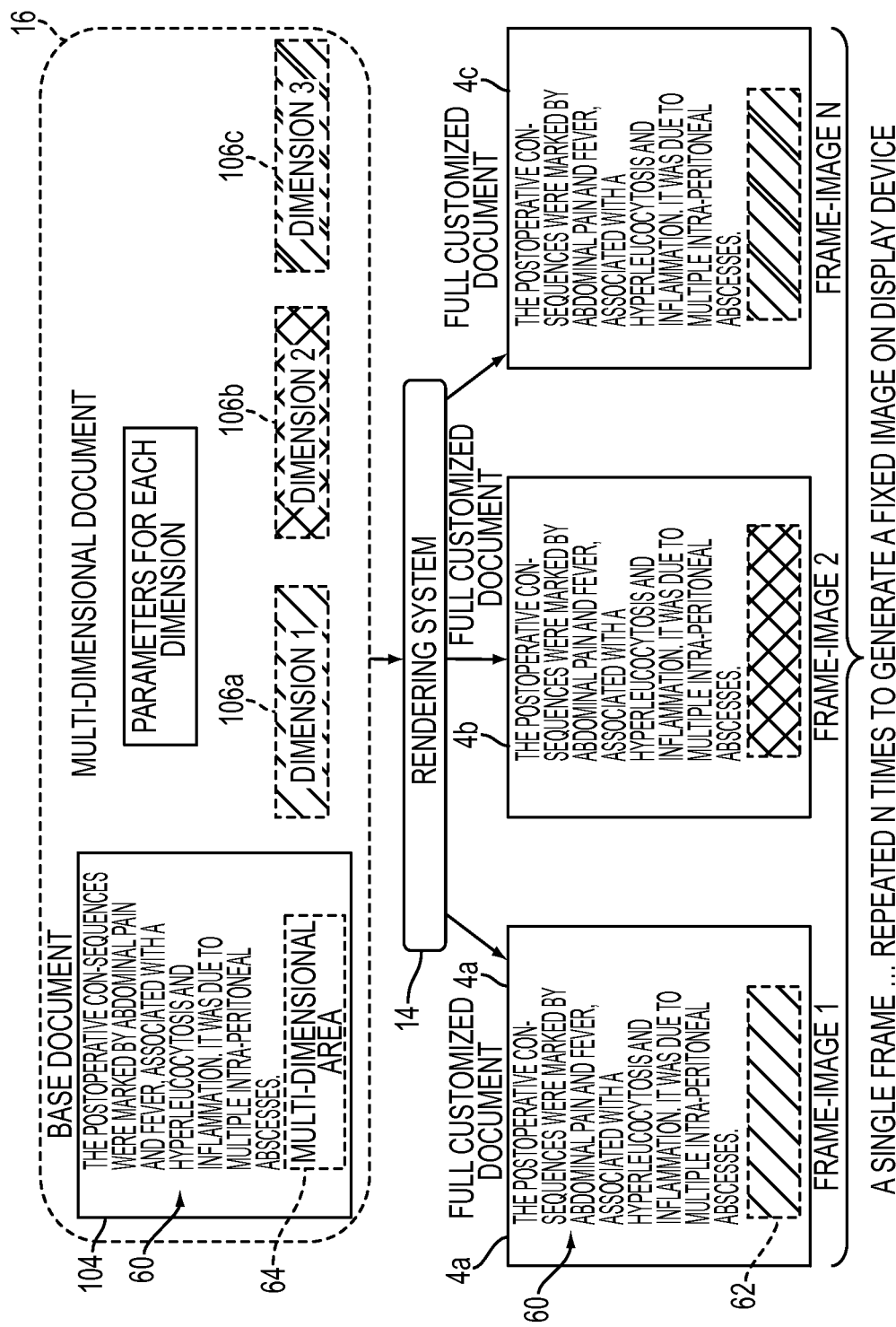
FIG. 7 illustrates aspects of the input and output of the method illustrated by FIG. 6.

At S300, the rendering module 116 creates a frame-image 4 for each dimension by integrating the multi-dimensional content 106 into the static content 104 according to the multi-dimensional parameters 108. FIG. 7 illustrates a static content document 104 with a multi-dimensional area 64 and three dimensions 106a, b, c, which are sized and shaped to be received within area 64. The rendering module 116 inserts each dimension 106 into customizable area 64 of the static document 104. The rendering module 116 creates a custom view of the static document 104 by arranging the multi-dimensional content 106 within the static document 104 according to multi-dimensional parameters 108. The rendering module 116 then creates a frame-image 4a, b, c for each custom view by generating an electronic representation (e.g., a computer image file such as a bitmap or other suitable embodiment) of the custom view that may be displayed on the display device. If the custom view is too large to fit on a display device (such as when a document has been zoomed in), then each frame-image 4 can be the viewable part of the custom view. In the case that there are no multi-dimensional areas on a static document frame, then all of the frame-images 4a, 4b, 4c may be identical.

Figure 8:
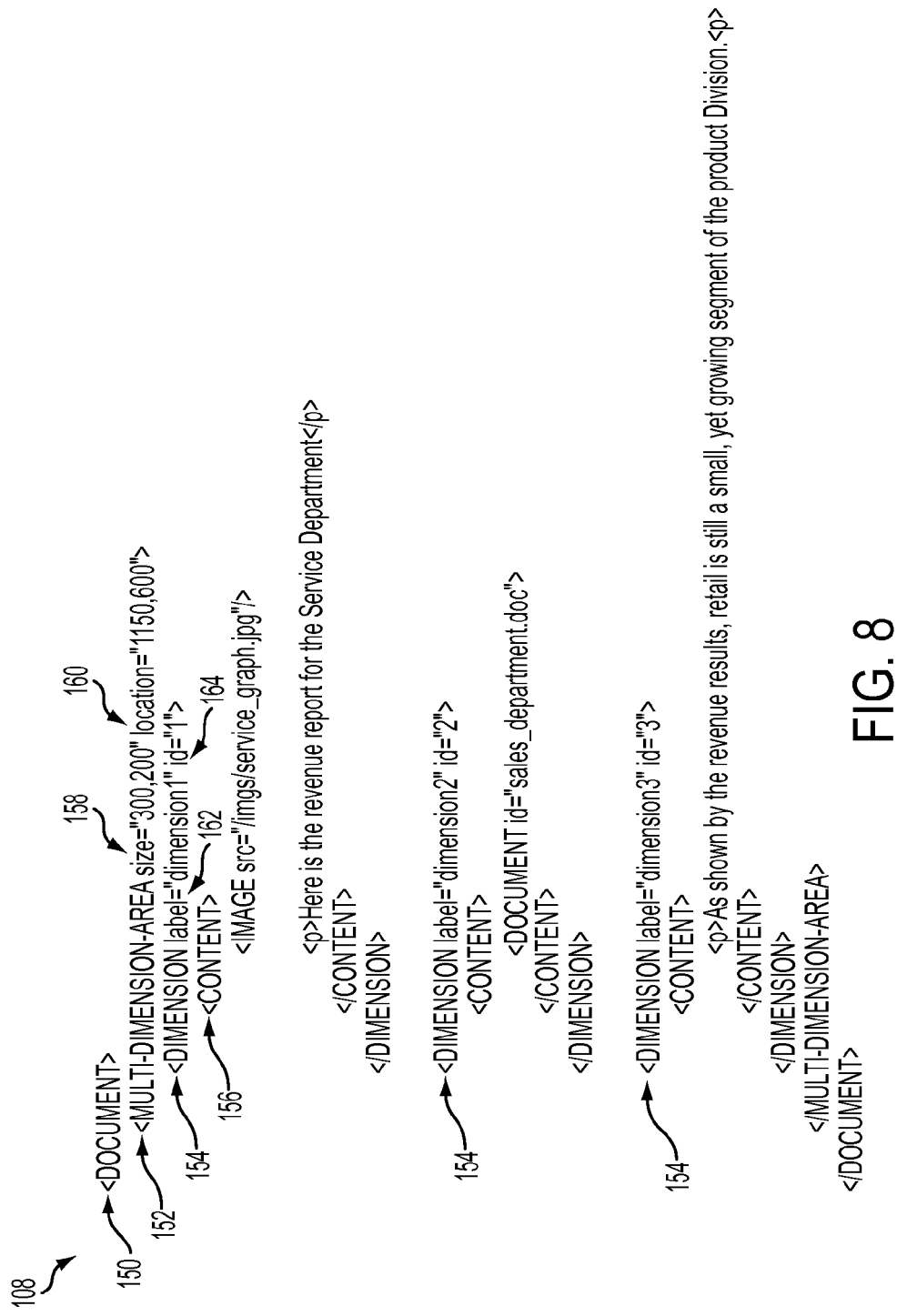
FIG. 8 illustrates exemplary multi-dimensional parameters embodied in an XML document.

FIG. 8 illustrates an exemplary set of multi-dimensional parameters 108 embodied in XML format that handles special tags (e.g., definitions) 150, 152, 154, 156 dedicated to multi-dimensional documents 16. The example tags 150, 152, 154, 156 may differ from embodiment to embodiment. In alternate embodiments, other suitable mechanisms for conveying parameter information may be used instead of an XML document. In the exemplary embodiment, multi-dimensional parameter XML document 108 encodes the document body 150 by defining at least one multi-dimension area tag 152 containing a plurality of dimension tags 154. The multi-dimension area tag 152 of the XML document 108 corresponds to a multi-dimension area 64 of the static content document 104 (FIGS. 3 and 4). Each dimension definition 154 within the multi-dimension area 152 of the XML document may include information related to the size 158 and location 160 of the document's multi-dimension area 64, as well as a label 162 and identification number 164 for the particular dimension 152. The size of the multi-dimensional area 64 may be defined within the multi-dimension parameters 108 or may be automatically computed by the rendering module 116. In the exemplary embodiment, the dimension identification number 164 is included and serves as a unique identifier for the respective dimension 106a, b, c. The dimension label 162 is optional, but assists in identifying the nature of the content represented by the dimension. The content node 156 within each dimension of the XML document 108 defines elements to be displayed within the multi-dimension area 64 for a particular custom view. The elements may include any object that may be visually displayed within a document, such as images and/or text. In the exemplary embodiment, if no content is defined for a given dimension, then the area 64 within the static content document 104 will appear empty for that particular custom view 4a.

At S400, the document processing system 14 outputs the n frame-images 4a, b, c, etc. to the display device 12. As previously noted, the multi-dimensional frames 2 may be multiplexed into a conventional television or display signal (such as an HDTV broadcast signal) by inserting each frame-image 4a, b, c into the signal individually at predefined intervals. The multiplexed signal may then be rendered on a conventional display device in the same way as any other 2D or 3D programming. Alternatively, the output device 122 may transmit a multi-dimensional frame 2 comprising each of the n-dimensions to the multi-dimensional display device 12 as a discrete data unit. In this case, the display device repeats each frame-image 4 in sequence at a predetermined frequency until a new multi-dimensional frame 2 is received from the system 14.

At S500, the display device 12 renders each of the n frame-images 4a, b, c at a specified frequency and is synchronized with one or more viewing devices 32, 38, etc. worn by respective users 30, 36, etc. The synchronization of the display rendering of the n frame-images 4 with each viewing device 32, 38 (by signaling device 46 and respective receivers 34, 40) allows each user 30, 36 wearing a viewing device 32, 38 to view exactly one of the n dimensions 4a, 4b (i.e., custom views) on the display device 12. Each user 30, 36 may be asked to set the receiver 34, 40 on his device to the correct time delay t for his visual content or may receive a pair of shutter glasses 32, 38 which are preset to the appropriate time delay.

With reference once more to FIG. 2, the interaction between the rendering system 14, multi-dimensional display device 12 and viewing devices 32, 38 may proceed as follows. The rendering system 14 generates multi-dimensional frames containing n frame-images and sends them to the display device 12. Concurrently, one or more users 30, 36 wear a respective viewing device 32, 38 synchronized with the frequency of one of the n frame-images rendered by the display device 12. In the case of shutter glasses, the synchronization causes the viewing device 32 to render both lenses transparent to the visual content at the same time that the corresponding frame-image 4a is rendered on the display device 124 such that the user 30 sees only a single custom view 4a. When the display device 12 is rendering other frame-images 4b, 4c, the viewing device 32 darkens both lenses or otherwise renders them opaque to the visual content so that the user 30 cannot see frame-images 4b, 4c related to other custom views.

In one aspect of the exemplary embodiment, users 30, 32 are allowed to select which customized view the viewing device should be tuned to via a selectable switch 180 on the receiver 34 or with a remotely controlled device. For example, with respect to FIGS. 3 and 4, an employee that works for multiple departments of a company may switch between viewing the product division financial report 4a and services division financial report 4b. If a particular part of a document is displayed such that all custom views are the same, then a signal may be sent to the receivers 34, 40 of the viewing devices 32, 34 to temporarily turn off filtering. This will reduce any eye strain on the users. Additionally, it is contemplated that a customized audio program may be played for each user depending on which custom view time delay the viewing device is tuned. The audio program may be provided by a separate audio device or an audio device integrated into the viewing device.

The method ends at S600.

The method illustrated in FIG. 6 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary system and method have various applications. For example, consider a multimedia presentation for security officials having differing security clearances wherein only one display device is available. With current technology, the multimedia presentation (such as a slide presentation) may include only information suitable for the lowest security clearance in the room so that persons do not acquire unauthorized information. However, in order to maximize efficiency, it may be beneficial to present multimedia content to each security official that is tailored to their respective security clearance. The present system allows each official to receive only the appropriate content.

Another example is in the case of a presentation to an audience of diverse languages. The present system avoids the need for a translator or for providing multilingual content to all viewers. Each viewer can view visual content in which the text (variable content) is in the appropriate language.

Another example may be when presenting content to a heterogeneous audience where viewers have different levels of background knowledge or interest in the topic. Conventionally, it is often difficult to adjust the content to capture the attention of everyone. If too many details are provided, some of the viewers will lose their focus. Similarly, if too few details are provided, experts on the topic may question the validity of the presentation because of its lack of explanation or details. The exemplary system and method allow customized views of the content to multiple persons on a single display device which are tailored to the respective needs, interests, and/or permission levels of members of the same audience.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for displaying visual content comprising:
providing visual content into computer memory, the visual content comprising a document including:
a static area comprising a document element which is common to a plurality of versions of the visual content;
a variable area for receiving a respective customized document element which is different for each version of the plurality of versions of the visual content;
a plurality of the customized document elements to be inserted into the variable area; and
generating a plurality of frame-images, one for each version of the plurality of versions of the visual content, each frame-image comprising static content comprising the at least one static area document element in the static area and variable content comprising the respective customized document element in the variable area;
displaying the plurality of frame-images repeatedly and in a sequence on a same display device, the plurality of frame-images including the static content which is the same for each of the plurality of versions of the visual content and the variable content which is different for each of the plurality of versions of the visual content, the displaying of the plurality of frame-images comprising brightening the variable area of the frame-image to compensate for a lower exposure time;
synchronizing the displaying of a first of the plurality of versions of the visual content with a first viewing device for a first viewer of the display device; and
synchronizing the displaying of a second of the plurality of versions of the visual content with a second viewing device for a second viewer of the display device, enabling the first and second viewers to view the static content together with respective different variable content substantially simultaneously with each other.

2. The method of claim 1, wherein each viewing device comprises an active shutter device comprising one lens for each eye of the respective viewer.

3. The method of claim 1, wherein each viewing device comprises at least one lens.

4. The method of claim 3, wherein the synchronizing comprises:
for the first viewing device:
permitting transmission of the visual content through the at least one lens of the viewing device during a first time period when the display device displays the first version of the visual content; and
blocking transmission of the visual content through the at least one lens of the viewing device during a second time period, subsequent to the first time period, when the display device displays the second version of the visual content.

5. The method of claim 1, wherein displaying the first and second versions of the visual content on the same display device comprises:

providing the plurality of frame-images at the display device; and displaying each frame-image sequentially on the display device.

6. The method of claim 5, further comprising:

repeating the display of each frame-image such that each frame-image is displayed for a predetermined amount of time at a predetermined frequency.

7. The method of claim 6, wherein the predetermined frequency is a function of a number of the versions and the refresh rate of the display device.

8. The method of claim 1, wherein the document elements comprise at least one of images and text.

9. The method of claim 1, further comprising providing multi-dimensional parameters defining the static areas, variable areas, and customized document elements for each document version; and generating a frame-image for each document version by arranging the static content and multi-dimensional content of each document version according to the multi-dimensional parameters.

10. The method of claim 1, wherein the multi-dimensional parameters define the location and size of the variable areas with respect to the static content.

11. The method of claim 1, wherein the multi-dimensional parameters are embodied in a markup language document.

12. The method of claim 1, wherein each viewing device is switchable between versions of the visual content, wherein switching between versions switches the variable content and does not switch the static content.

13. The method of claim 1, further comprising:

providing first audio content corresponding to the first version of the visual content to the first viewer with a first audio device; and providing second audio content corresponding to the second version of the visual content to the second viewer with a second audio device.

14. A computer program product comprising non-transitory media encoding instructions which when executed by a computer associated with a display device, causes the display device to perform the method of claim 1.

15. The method of claim 1, wherein the plurality of customized document elements contain textual information, the textual information of the second of the plurality of versions being a translation of the textual information of the first of the plurality of versions.

16. A system for generating visual content for simultaneous display on a same display device, comprising:

memory which stores:

static content comprising at least one document element common to a plurality of versions of a document, multi-dimensional content comprising at least one customized document element for each document version to be inserted into a variable area within the respective version of the document, and multi-dimensional parameters defining static areas, variable areas, and customized document elements for each document version;

a rendering module adapted to generate a first frame-image corresponding to a first of the document versions and a second frame-image corresponding to a second of the document versions by arranging the static content and multi-dimensional content of each document version according to the multi-dimensional parameters; a computer processor for implementing the rendering module; and a display device which receives the generated first frame-image and second frame-image and displays the first and second frame-images repeatedly and in a sequence whereby:

a first associated viewing device synchronized with the first frame-image permits a viewer to view the first version and not the second version; and a second associated viewing device synchronized with the second frame-image permits a viewer to view the second version and not the first version.

17. The system of claim 16, wherein the system includes the first and second viewing devices.

18. The system of claim 17, wherein each viewing device comprises an active shutter device comprising one lens for each eye of a user; and wherein each viewing device is adapted to:

undarken both lenses of the viewing device during a time period when the display device displays the corresponding frame-image; and darken both lenses of the viewing device when a non-corresponding frame-image is displayed on the display device.

19. The system of claim 16, wherein the display device displays the first and second frame-images sequentially and substantially simultaneously a plurality of times.

20. The system of claim 16, wherein the rendering module inserts the at least one customized document element into the variable area of a self-contained static document that includes only the static content.

21. A method comprising:

providing visual content into computer memory, the visual content comprising a document including:

at least one static area comprising a document element common to a plurality of versions of the visual content, each of the plurality of versions in a different respective language;

at least one variable area for receiving a document element customized for each version of the plurality of versions of the visual content;

multi-dimensional displayable visual content comprising a plurality of customized document elements to be inserted into the respective at least one variable area for each of the plurality of versions of the visual content, the document elements containing textual information in a language of the respective version of the visual content; and a plurality of multi-dimensional parameters defining the at least one static area, the at least one variable area, and the plurality of customized document elements;

generating a plurality of frame-images, one for each version of the plurality of versions of the visual content, by arranging the static content and multi-dimensional content of each document version according to the multi-dimensional parameters, each customized document element of the plurality of customized document elements being inserted into the respective variable area, the plurality of frame-images including a first frame-image and a second frame image; and repeatedly and in sequence, displaying the first and second frame images on a same display device at a frequency such that they are substantially simultaneously displayed, whereby when first and second viewers wear respective synchronized viewing devices, the first viewer views the first frame image and the respective textual information in a first language of the respective version and not the second frame image and the second viewer views the second frame image and the respective textual information in a second language of the respective version and not the first frame image, the first language being a different language from the second language.

* * * * *